United States Patent
Fawal et al.

(10) Patent No.: US 6,341,135 B1
(45) Date of Patent: Jan. 22, 2002

(54) LOW POWER BUFFER SYSTEM FOR NETWORK COMMUNICATIONS

(75) Inventors: Marwan A. Fawal, Santa Clara; Burton B. Lo, San Francisco; Anthony L. Pan, Fremont, all of CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/032,382

(22) Filed: Feb. 26, 1998

(51) Int. Cl.[7] ............................................... G01R 19/00
(52) U.S. Cl. ....................................... 370/419; 327/108
(58) Field of Search ................................. 370/463, 214, 370/243, 244, 245, 247, 248, 249, 250, 251, 401, 419, 428, 347, 442, 441; 375/224, 212, 213, 215; 365/230.08, 230.02; 327/108, 109, 112; 333/177; 341/144

(56) References Cited

U.S. PATENT DOCUMENTS 5,191,555 A * 3/1993 Tabacco et al. ......... 365/230.08
5,818,269 A * 10/1998 Brown et al. ................ 327/108

OTHER PUBLICATIONS

Stremler, Ferrel G., "Introduction to Communication Systems" Second Edition, Addison–Wesley Publishing, Reading, Massachusetts, (1977) Chapters 7 and 10, pp. 351–429, 571–633.

* cited by examiner

Primary Examiner—Dang Ton
(74) Attorney, Agent, or Firm—McDonnell Boehnen Hulbert & Berghoff

(57) ABSTRACT

NMOS transistor buffers are used to buffer the output of a system. The system can include a network interface card. The NMOS transistor buffers receive the output of the shaped Ethernet data signals and drive a transformer. The NMOS transistor buffers allow for low power consumption while a feedback monitoring system provides stability by controlling the inputs to the NMOS transistors.

13 Claims, 14 Drawing Sheets

LOW POWER BUFFER SYSTEM FOR NETWORK COMMUNICATIONS

1. RELATED APPLICATION

The invention described and claimed herein relates to the following United States patent applications, which are incorporated by reference.

"System and Method to Reduce Electromagnetic Interference Emissions in a Network Interface," having Ser. No. 09/031,265, filed Feb. 26, 1998, and having inventors Marwan A. Fawal, Burton B. Lo, Anthony Pan, George Kwan.

"Programmable Compensation and Frequency Equalization for Network Systems," having Ser. No. 09/031,368, filed Feb. 26, 1998, and having inventors Marwan A. Fawal, Burton B. Lo, Anthony Pan, George Kwan.

"Network Communications Using Sine Waves," having Ser. No. 08/866,566, filed May 30, 1997, and having inventors Marwan A. Fawal and Burton B. Lo.

"Isolation and Signal Filter Transformer," having Ser. No. 05/801,602, filed Apr. 30, 1996, and having inventors Marwan A. Fawal, Anthony L. Pan, Eric R. Davis and Richard S. Reid.

2. THE BACKGROUND OF THE INVENTION a. The Field of the Invention

This invention relates to the field of network systems. In particular, the invention relates to a systems for reducing electromagnetic interference emissions in network interfaces.

b. Background Information

Ethernet is an industry standard (e.g., IEEE 802.3 specification) method of communicating between various devices and a local area network. For example, a computer includes a network interface card (NIC) that formats Ethernet data for transmission onto a network cable. The network cable carries the Ethernet formatted packets out to the rest of the network. The data signal is generated to comply with a particular specification for that type of Ethernet communications. For example, the Ethernet data signal might be generated to comply with the ANSI/IEEE standard 802.3 Ethernet voltage template. This voltage template applies to five and ten MHz frequency components of Ethernet data communications. Complying with the voltage template ensures that the NIC will not damage other devices connected to the cable, and ensures that other devices will be able to properly receive and decode the signals from the NIC.

One prior art NIC is shown in FIG. 1. This NIC is available from 3COM Corporation, of Santa Clara, Calif. The NIC 100 is for generating the transmit signal 130 which corresponds to an Ethernet transmit signal. The transmit signal 130 is generated to support Manchester encoding of the Ethernet data. The transmit signal 130 is a combination of two other signals, a data signal and a pre-emphasis signal. The pre-emphasis signal adds a slight step to some of the waves in the transmit signal 130.

The transmit signal 130 is created from four output signals from the Ethernet controller 101. The Ethernet controller 101 is responsible for generating the pre-emphasis signal and the data signal. The combinations of these signals is eventually transmitted as the transmit data plus (TDP) 112 and the transmit data minus (TDM) 114. Between the Ethernet controller 101 and the transformer 120 is a filter circuit that filters and combines the four output signals from the Ethernet controller 101 into the transformer 120. (The transformer 120 is for electrical isolation and includes a seven pole filter.) The transformer 120 is available from Valor Corporation.

As part of the FCC's electromagnetic interference regulations, the NIC 100 must not emit an amount of electromagnetic radiation above a preset limit. The FCC and CISPR-B specifications, for example, limit the radiation from the NIC 100. Importantly, any harmonic output above the fundamental frequency must be less than twenty-seven DB below the output at the fundamental frequency. Therefore, it is desirable to be able to reduce the amount of these high frequency components.

One problem with the NIC 100 is that the environment in which the NIC operates varies considerably (e.g., the temperature changes, the load on the wire changes, variations in the manufacturing processes, power supply variations). This variation can result in a change in the transmit signal 130. For example, the temperature of the NIC 100 can significantly change the signal strength of the transmit signal 130. The variation also arises as a result of manufacturing differences between different NICs 100. This variation is undesirable in that it is difficult to meet the electromagnetic interference specification requirements while maintaining the desired output levels for the transmit signal 130. Therefore it is desirable to have some form of control over these output values.

Also, it is desirable to reduce the filtering requirements after the output of the Ethernet controller 101. Reducing the filtering requirements can reduce the component count of the NIC 100. This may significantly reduce the manufacturing costs of the NIC 100.

3. A SUMMARY OF THE INVENTION

NMOS transistor buffers are used to buffer the output of a system. The system can include a network interface card. The NMOS transistor buffers receive the output of the shaped Ethernet data signals and drive a transformer. The NMOS transistor buffers allow for low power consumption while a feedback monitoring system provides stability by controlling the inputs to the NMOS transistors.

In some embodiments, operational amplifiers are used at the inputs of the NMOS transistor buffers to reduce the RC time constant of the NMOS transistor buffer. This enhances the performance of the buffers.

Although many details have been included in the description and the figures, the invention is defined by the scope of the claims. Only limitations found in those claims apply to the invention.

4. A BRIEF DESCRIPTION OF THE DRAWINGS

The figures illustrate the invention by way of example, and not limitation. Like references indicate similar elements.

5. THE DESCRIPTION a. Overview of Description

The following describes not only the specific embodiments of the invention, but also the general context in which the various embodiments can be used. As such, a system in which the invention can be used is described as well as specific embodiments of the invention. Graphs of various signals in the system are then described. Finally, additional alternative embodiments are described.

b. Network Interface Card

Figure 1:
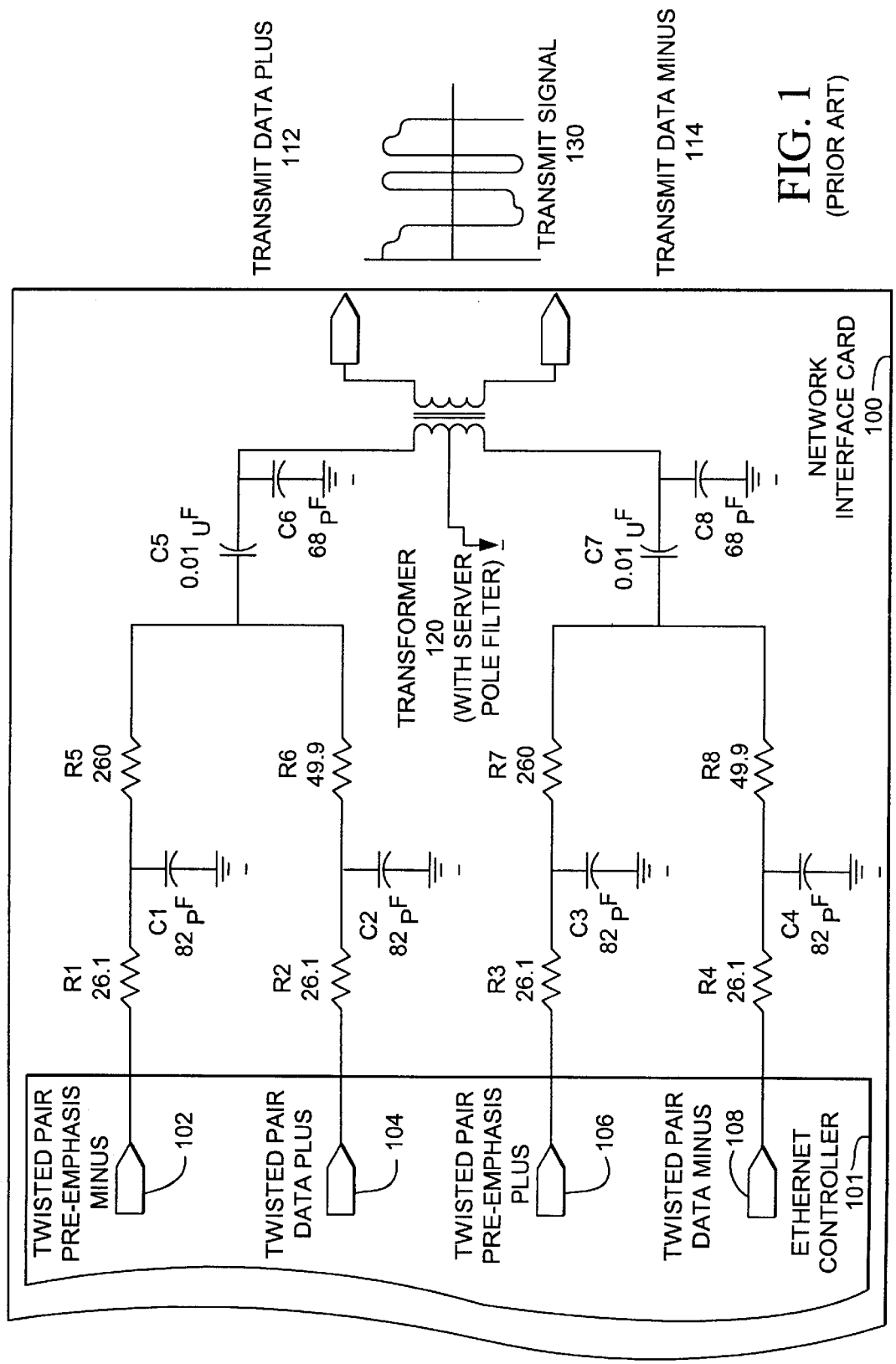
FIG. 1 illustrates a prior art Ethernet network interface card.
Figure 2:
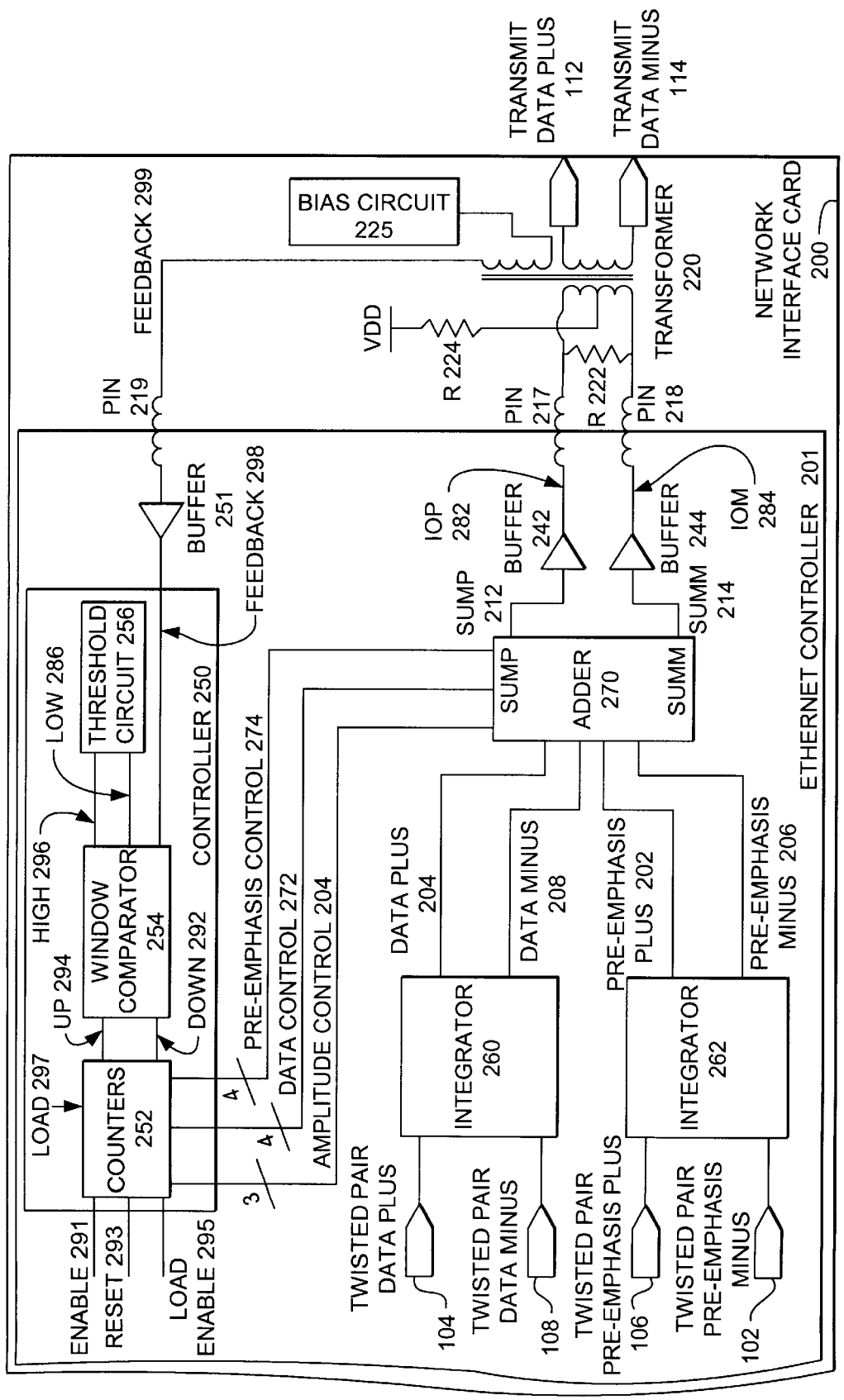
FIG. 2 illustrates an Ethernet network interface card (NIC) having gain control and filtering for improved Ethernet network communications.

FIG. 2 illustrates an Ethernet network interface card as may be used in one embodiment of the invention. Generally, the NIC of FIG. 2 can be thought of as having transmission components and feedback components. The transmission components prepare a transmission signal for transmitting onto the wire coupled to the network interface card. The feedback components monitor the transmitted signal and modify the inputs to the transmission components to adjust the signal being transmitted. The following description first lists all the elements of FIG. 2, then their interconnections, and finally their operation.

FIG. 2 includes the following elements. A network interface card 200 which includes a transformer 220, a resistor 222, a resistor 224, a bias circuit 225, and an Ethernet controller 201. The Ethernet controller 201 includes the following elements: a controller 250; an data integrator 260; a pre-emphasis integrator 262; a differential current adder 270; a buffer 242; a buffer 244; a buffer 251; and three pins (pin 217, pin 218, and pin 219). The controller 250 includes a window comparator 254, and a counter 252.

The elements of FIG. 2 are coupled as follows. The coupling of the transmission elements is first described, then the coupling of the feedback components is described. The twisted pair data minus 108 and the twisted pair data plus 104 are fed to the inputs of the data integrator 260. The twisted pair pre-emphasis minus 102 and the twisted pair pre-emphasis plus 106 are fed to the data inputs of the pre-emphasis integrator 262. The outputs of the data integrator 260 are the data plus 204 signal and a data minus 208 signal, which are coupled to the adder circuit 270. The outputs of the integrator 262, a pre-emphasis minus 206 signal and a pre-emphasis plus 202 signal, also couple to the adder circuit 270. The output of the current adder circuit 270 are a signal SUMP 212 and SUMM 214, which are coupled to the inputs of the buffer 242 and the buffer 244, respectively. The outputs of the buffer 242 and the buffer 244, IOP 282 and IOM 284, are coupled to the pin 217 and the pin 218, respectively. The outputs from the pin 217 and the pin 218 are coupled across the resistor 222 and the primary winding of the center tapped transformer 220. The center tap of the transformer is coupled to the resistor 224, which is in turn coupled to VDD. A secondary winding of the transformer 220 is coupled across the communications cable coupled to the NIC 200. Thus, this secondary winding transmits the TDP 112 signal and the TDM 114 signal.

The coupling of the feedback components is now described. The bias circuit 225 couples to an additional winding of the transformer 220. The other end of the winding, corresponding to the feedback 299 signal is coupled to the pin 219. The other end of the pin 219 is coupled to the buffer 251. The output of the buffer 251 is the feedback signal 298, which is coupled to an input of the window comparator circuit 254. The plus and minus increment outputs of the window comparator circuit 254 are coupled to the up and down inputs of the counter 252. The counter 252 also receives a load signal 297, an enable signal 291, a reset signal 293, and a load enable signal 295. The output of the counter 252 is a three bit amplitude control signal 271, a four bit data control signal 272, a four bit pre-emphasis control signal 274. In this embodiment, the feedback signal is received from the transformer 220. In other embodiments, the feedback from the buffer 242 and the buffer 244 is used.

The following describes the general operation of the Ethernet controller 201. Additional details of some aspects of the invention are described below. The previously generated digital Ethernet signals, twisted pair data plus 104 and twisted pair data minus 108, are fed to the integrator 260. The integrator 260 converts the digital signals to sawtooth/pseudo-sinewave waveforms (which can then be filtered by off-chip filters built into the transformer 220). Similarly, the twisted pair pre-emphasis plus 106 and pre-emphasis minus 102 are integrated by the integrator 262. The outputs from the two integrators are added and integrated in the differential current adder, current adder 270. The controller 250 provides control information to the current adder 270. This control information allows the current adder 270 to provide a programmable compensation for the data and the pre-emphasis signals, and ultimately control the value of TDP 112 and TDM 114. That is, the current adder 270, given the output from the controller 250, will integrate, add, and provide a predetermined gain to the data plus 204, the data minus 208, the pre-emphasis plus 202 and the pre-emphasis minus 206 signals.

The SUMM 214 and the SUMP 212 now pass through the buffers and the elements external to the Ethernet controller 201. The buffer 242 and the buffer 244 buffer the output SUMM 214 and SUMP 212 signals from the current adder 270 to generate IOP 282 and IOM 284, respectively. IOP 282 and IOM 284 are fed to the pin 217 and the pin 218, respectively. Each pin acts as a ten nH inductor. The outputs from the pin 217 and the pin 218 are across the 400 ohm resistor 222. The resistor 222 is for impedance matching. The resistor 224 is a forty ohm resistor that serves as a current source and output voltage limiter (important in some embodiments where the buffer 242 and the buffer 244 include NMOS transistor buffers). The resistor 224 determines the pivot point for the transformer 220. If the value of the voltage at the center tap is 2.5 volts, then from the center tap to the one side is 2.5 volts and the same is true from the center tap to the other side. Without the resistor 224, the voltage at each pin may exceed the specifications of some semiconductors and conflict with design rule. The transformer 220 has a 2:1 winding ratio (e.g., if TDM is taken from the center tap of the second winding of the transformer 220). Thus, to provide 100 ohms of impedance matching at V(TDP 112, TDM 114), the resistor 222 is 400 ohms.

In some embodiments, additional filtering circuits are included or the inherent filtering characteristics of the transformer 220, and other components, are used to reduce the high frequency components of the TDP 112 and TDM 114 signals.

In some embodiments, the isolation transformer 220 includes filtering characteristics. One such isolation transformer is described in the U.S. patent application Ser. No. 08/641,375, now U.S. Pat. No. 5,801,602, and entitled "Isolation and Signal Filter Transformer," having inventors Marwan A. Fawal, and Anthony Pan, which is incorporated herein by reference. In other embodiments, between the IOP 282 and IOM 284 outputs and the TDP 112 and the TDM 114, some filtering is included to help block high frequency signals. However, in other embodiments, no such filtering is needed because of the wave shaping characteristics of the adder circuit 270 and the inherent filtering of some of the other elements.

The feedback in the NIC 200 is now described. Upon an initiation event, the controller 250 samples the feedback 299 and causes the current adder 270 to adjust the levels of the TDP 112 and the TDM 114 signals. This initiation event is important for determining when feedback adjustments can be made. In some embodiments, it is possible to make adjustments to the inputs to the current adder 270 at any time. However, in other embodiments, to avoid glitches from jitter, adjustments are made only during adjustment periods. For example, when the network is idle, at the beginning of a packet, as part of the link pulse between the NIC 200 and a hub, or in response to a special packet, are examples of events that correspond to possible initiation events.

Sampling the feedback involves the following elements. The bias circuit 225 provides a bias voltage for the third winding of the transformer 220. In some embodiments, the bias circuit 225 includes two series resistors coupled between VDD and ground. One end of the third winding is coupled to the middle of the series resistors. This third winding provides a sample (feedback 299 signal) of the TDP 112 and TDM 114 signals. (In some embodiments, a third winding is not used, but TDM 114 is taken from the center tap of the second winding of the transformer 220. In these embodiments, the bias circuit 225 may be moved onto the Ethernet controller 201 to bias the output of the buffer 251.)

The feedback 299 is fed back into the Ethernet controller 201 through pin 219. The pin 219 acts as a 10 nH inductor. The buffer 251 buffers the feedback 299 signal to produce the feedback 298 signal. In some embodiments, the buffer 251 is an input buffer with level shifting capabilities. The feedback 298 signal is provided to an input of the window comparator 254. The window comparator 254 also receives a high threshold 296 signal and a low threshold 286 signal from the threshold circuit 256. The high threshold 296 signal and the low threshold 286 signal provide the high and low voltage window in which no adjustments need be made. In this voltage window, the output signals TDP 112 and TDM 114 are in an appropriate range. The window comparator 254 includes two operational amplifiers. One of the operation amplifiers receives the high threshold 296 signal and the feedback 298 signal and generates a down 292 signal. The other operation amplifier receives the low threshold 286 signal and the feedback 298 signal and generates an up 294 signal. The up 294 and the down 292 signals are provided to the up and down inputs of the counters 252.

The counters 252 include up/down counters for controlling the values of the data control 272 and pre-emphasis control 274. The counters 252 also receive a load 297 signal, an enable 291 signal, a reset 293 signal, and a load enable signal 295. The up 294 signal and the down 292 signal, when the enable 291 signal is set, cause the counters 252 to increase and decrease, respectively, the values in the counters 252. The reset 293 signal is used to reset the counters 252 (e.g., during initialization). The load enable 295 signal is used to load the load 297 signal values into the counters 252 (e.g., after initialization). The values in the counters correspond to the data control 272 signal, the pre-emphasis control 274 signal, and the amplitude control 271 signal.

c. Integrators

Figure 3A:
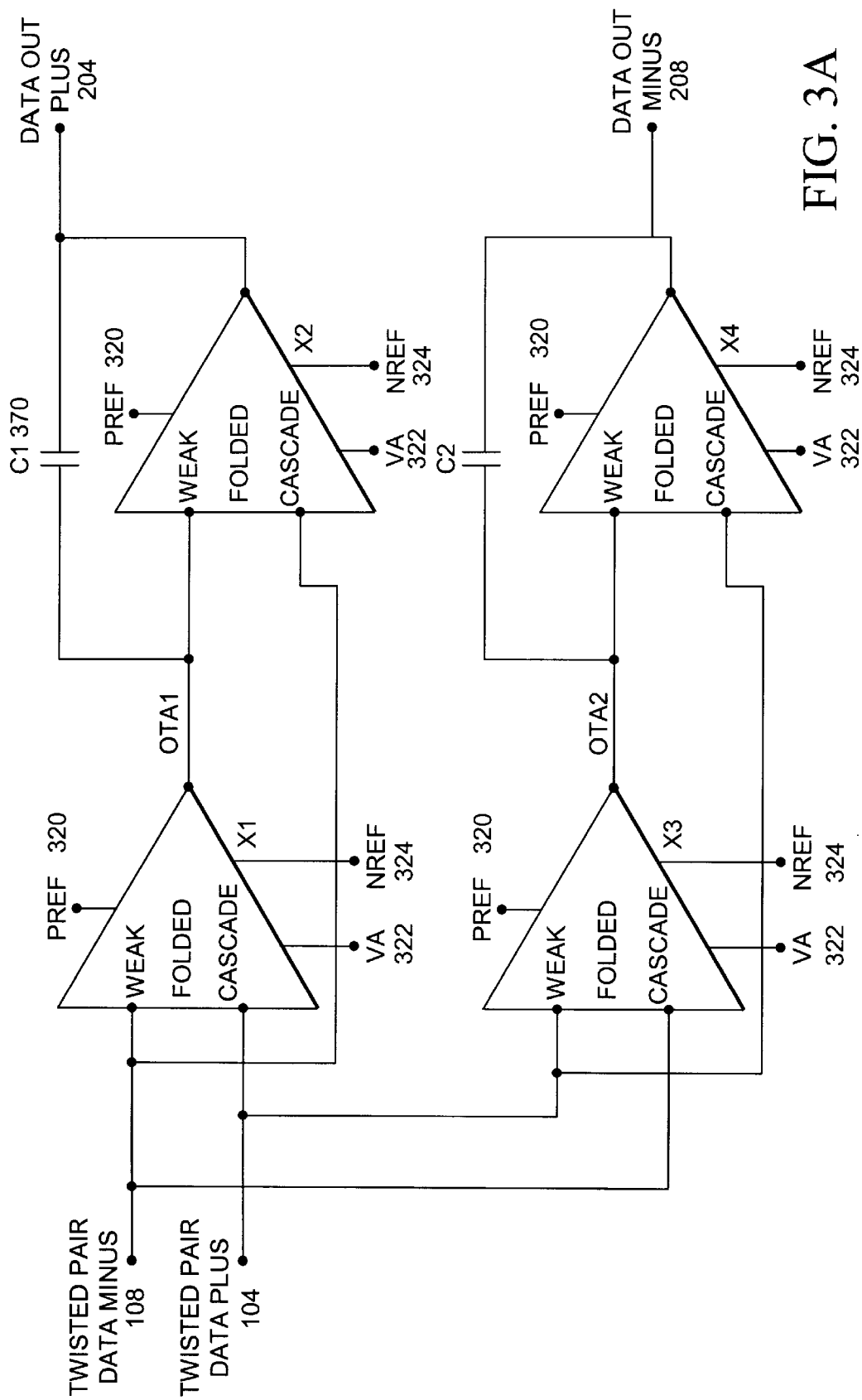
FIG. 3A illustrates an integrator used in the NIC of FIG. 2.

FIG. 3A illustrates one embodiment of the integrator 260. The integrator 262 is similarly designed. The integrator 260 operates to perform an integration of the digital Ethernet data signals twisted pair data minus 108 and twisted pair data plus 104. The integration converts the square wave digital Ethernet data signals into sawtooth waves.

FIG. 3A includes the following elements: an operational amplifier 330; an operational amplifier 340; an operational amplifier 350; an operational amplifier 360; a capacitor 370; and a capacitor 372.

The elements of FIG. 3A are coupled as follows. The twisted pair data minus 108 signal is coupled to the minus inputs of the low slew rate cascode operational amplifier 330 and the low slew rate cascode operational amplifier 350. The twisted pair data plus 104 signal is coupled to the plus inputs of these amplifiers. The twisted pair data minus 108 signal is also coupled to the plus input of the low slew rate cascode operational amplifier 340. The twisted pair data plus 104 signal is also coupled to the positive input of the low slew rate cascode operational amplifier 360. The output of the operational amplifier 330 is coupled to the minus input of the operational amplifier 340. The output of the operational amplifier 350 is coupled to the minus input of the operational amplifier 360. The capacitor 370 is coupled across the minus input and the output of the operational amplifier 340. The capacitor 372 is coupled across the minus input and t he output of the operational amplifier 360. Each operational amplifier is also coupled to receive a PREF 320 signal, a NREF 324 signal, and a VA 322 signal (these are simply reference and power signals for the operational amplifiers).

As noted above, the first stage of the amplifiers (operational amplifier 330 and operational amplifier 350) serve as transconductance amplifiers to limit current and control the rate of integration in the second state. The second stage (operational amplifier 340 and operational amplifier 360) creates sawtooth waves from the square digital Ethernet waves. Additional filtering off the Ethernet controller 201 help smooth the sawtooth waves. (Other filtering is performed by other operational amplifiers by clipping and smoothing the output signals.) In some embodiments, a double integration process is used. In this process, the first stage also integrates. These embodiments reduce the need for off chip filtering.

Figure 3B:
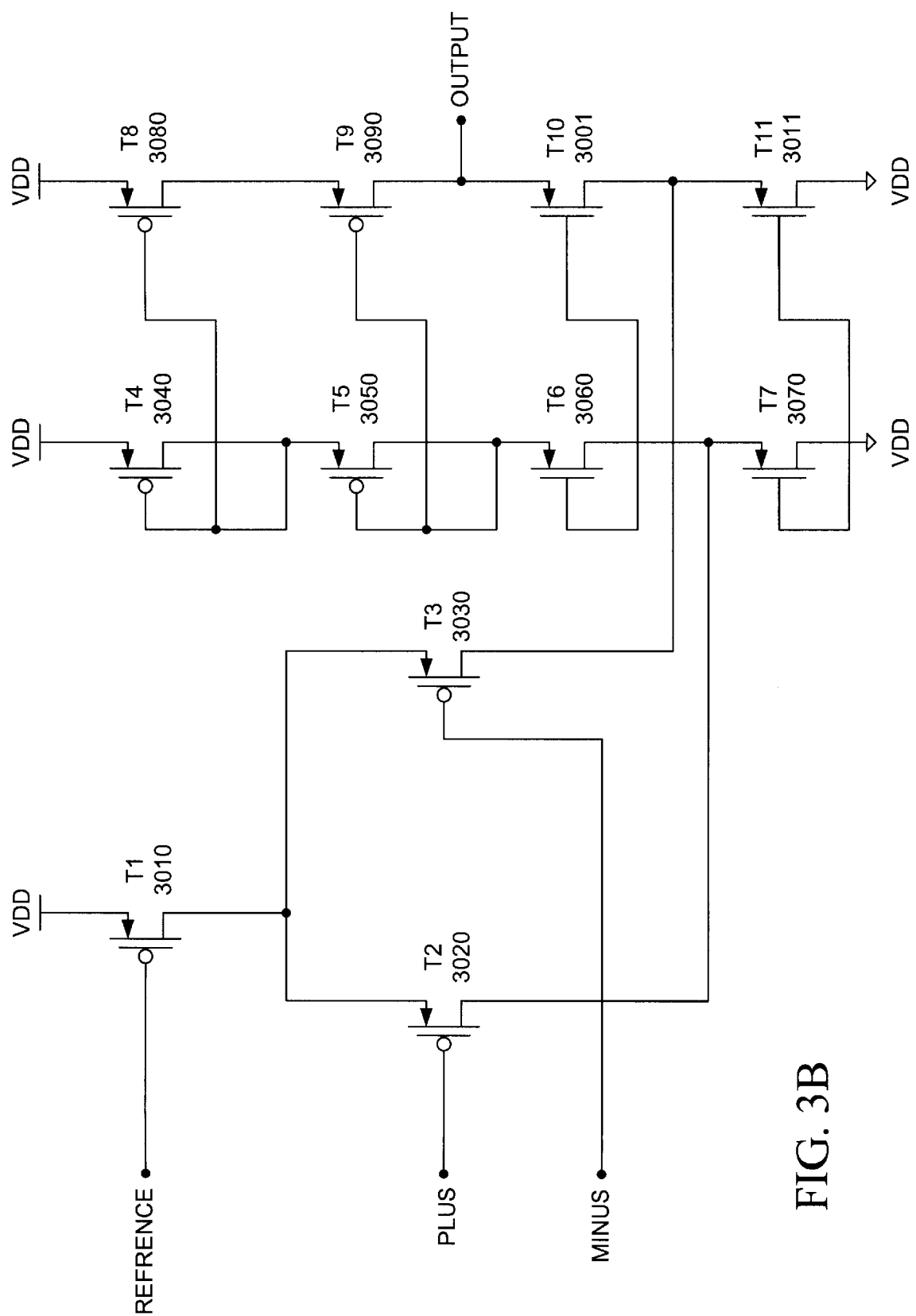
FIG. 3B illustrates a cascode operational amplifier as used in the integrator of FIG. 3A.

The low slew rate cascode amplifiers are shown in FIG. 3B. The following first lists the elements of FIG. 3B, and then their interconnections and operation. The op-amp of FIG. 3B is implemented using a CMOS fabrication process. FIG. 3B includes the following p-type transistors: T1 3010, T2 3020, T3 3030, T4 3040, T5 3050, T8 3080, and T9 3090. FIG. 3B also includes the following n-type transistors: T6 3060, T7 3070, T10 3001, and T11 3011.

The interconnection between the elements of FIG. 3B, and their inherent resulting operation, are now described. The reference voltage for the amplifier couples to the gate of T1 3017. The drain of T 3010 couples to VDD and the source couples to the drains of T2 3020 and T3 3030. The plus input couples to the gate of T2 3020 while the minus input couples to the gate of T3 3030. The source of T2 3020 couples to a first column of transistors. The source of T3 3030 couples to a second column of transistors. The first column of transistors includes T4 3040 which has its drain coupled to VDD and its source coupled to the drain of T5 3050. The source of T5 3050 couples to the source of T6 3060. The drain of T6 3060 couples to the source of T2 3020 and to the source of T7 3070. The drain of T7 3070 couples to VSS. T3 3030, T8 3080, T9 3090, T10 3001, and T11 3011 are coupled in similar fashion. Also, the gates of the following pairs of transistors are coupled together: T4 3040 and T8 3080; T5 3050 and T9 3090; T6 3060 and T10 3001; and, T7 3070 and T11 3011. The output of the op-amp couples to the source of T9 3090. The resulting operational amplifier has a high output impedance and a resulting high gain.

d. Differential Current Adder

Figure 4:
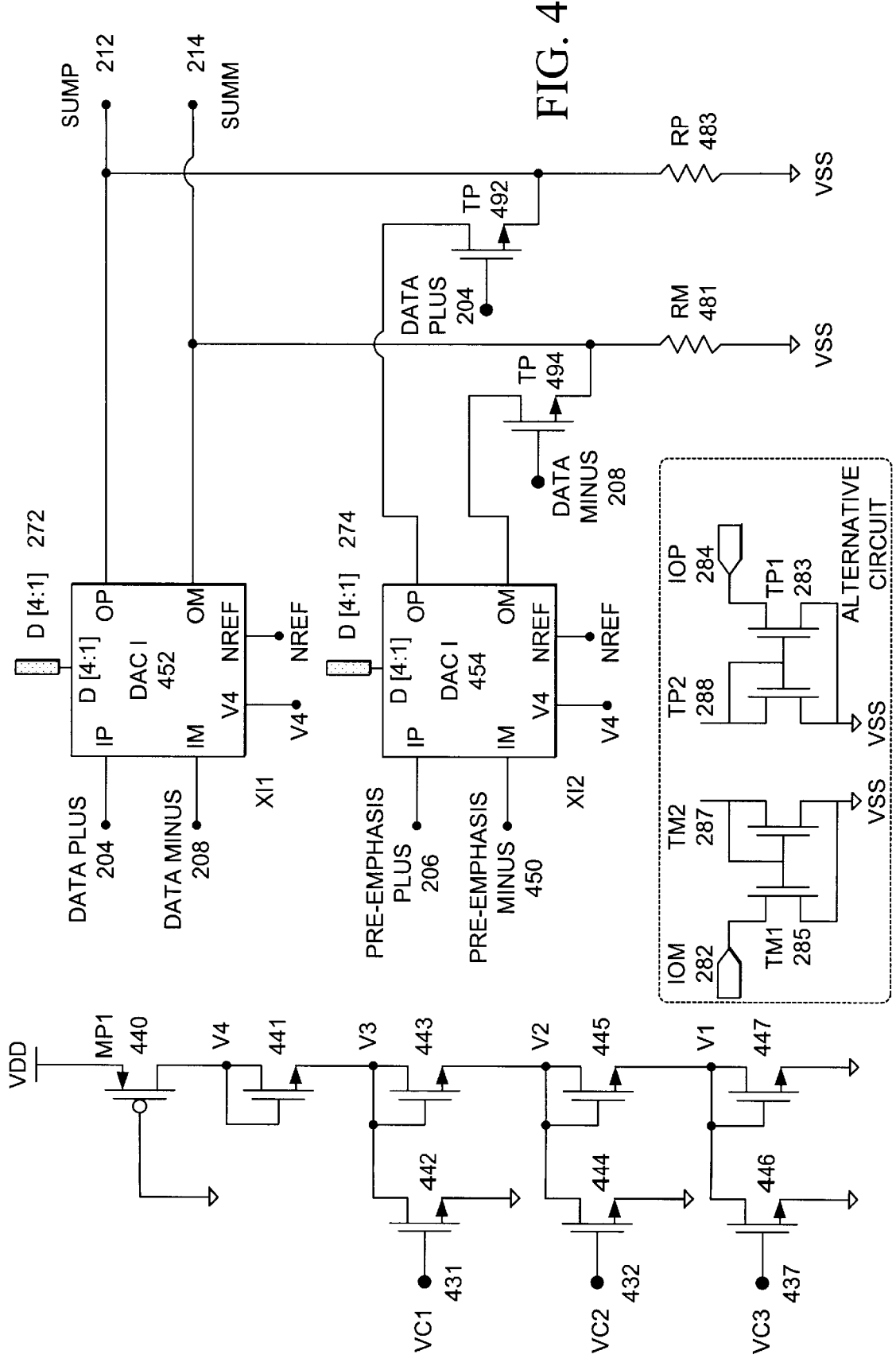
FIG. 4 illustrates a differential current adder, as may be used in the NIC, having pre-emphasis control and amplitude control.

FIG. 4 illustrates one embodiment of the adder circuit 270. The adder circuit has two capabilities. First, the adder circuit 270 adjusts the levels of the pseudo-sinusoidal data and pre-emphasis signals according to the control signals received from the feedback control 250. Second, the adder circuit combines the data and pre-emphasis signals into one signal. The following paragraphs first list the elements of the FIG. 4, then describes their interconnections, and finally describes their operations.

FIG. 4 includes an amplitude control circuit and the current adder circuit. The amplitude control circuit includes the following elements: a PMOS transistor 440, and a number of NMOS transistors (transistor 441, transistor 442, transistor 443, transistor 444, transistor 445, transistor 446, and transistor 447). The current adder circuit includes the following elements: a digital to analog converter (DAC) 422, a DAC 424, a NMOS transistor TM 494, an NMOS transistor TP 492, a resistor RM 481 and a resistor RP 483.

The elements of the amplitude control circuit are coupled as follows. The gate of the transistor 440 couples to VSS. The source couples to VDD. The drain couples to the drain and gate of the transistor 441. The drain of transistor 440 also couples to the signal V4 454. The source of the transistor 441 couples to the drain and gate of the transistor 443 and the drain of the transistor 442. The gate of the transistor 442 couples to the signal VC1 431 while the source couples to VSS. The source of the transistor 443 couples to the drain and gate of the transistor 445, and to the drain of the transistor 444. The source of the transistor 443 also corresponds to the signal V2 450, which is used inside of the DACs. The gate of the transistor 445 couples to the signal VC2 432 while the source couples to VSS. The source of the transistor 445 couples to the drain and gate of the transistor 447, and to the drain of the transistor 446. The gate the transistor 446 couples to the signal VC3 433 while the source couples to VSS. The source of the transistor 447 couples to VSS.

The operation of the amplitude control circuit is quite simple. The signals VC3 433 through VC1 431 act together to control the amplitude of some of the signals used in the adder circuit 270.

The elements of the current adder circuit are coupled as follows. The data plus 204 signal and a data minus 208 signal are coupled to the plus input and minus input of the data DAC 422 and are also coupled to the gates of the transistors TP 492 and TM 494, respectfully. The pre-emphasis minus 202 signal and a pre-emphasis plus 206 signal are coupled to the plus input and minus input of the pre-emphasis DAC 424, respectively. The controller 250 couples to the four bit input of the data DAC 422 and the four bit input of the pre-emphasis DAC 424. The amplitude controller signal V4 454 is coupled to the voltage inputs of the data DAC 422 and the pre-emphasis DAC 424. A reference voltage is coupled to the reference inputs of the data DAC 422 and the pre-emphasis DAC 424. The plus output of the data DAC 422 is coupled to SUMP 212 signal. The minus output of the data DAC 422 is coupled of the SUMM 214 signal. The plus and negative outputs of the pre-emphasis DAC 424 are coupled to the sources of TP 492 and TM 494, respectively. The source of TP 492 is coupled to the signal SUMP 212. The source of the transistor TM 494 is coupled to the signal SUMM 214. SUMP 212 and SUMM 214 are coupled to the resistor RP 483 and the resistor RM 481, respectively. The other ends of these resistors are coupled to VSS.

The current adder circuit accepts the input signals data plus 204, data minus 208, pre-emphasis plus 206 and pre-emphasis minus 202, and converts the voltages to currents. The paired current outputs from the DACs are added together by dissipating the total current into a corresponding resistor (RM 481 and RP 483, respectively). That is, the voltage of SUMP 212 is calculated as the current from the positive output of the DAC 422 plus the current from the TP 492 (corresponding to the current from the positive output of the DAC 424) all multiplied by the resistor RP 483. The voltage of SUMM 214 is calculated in a similar fashion. The output sums are a voltages across the respective resistors. The transistors TP 492 and TM 494 have their gates coupled to data minus 208 and data plus 204, respectively. These transistors ensure that there will be no pre-emphasis unless data is present.

An alternative circuit can be used to replace the resistors RM 481 and RP 483. In some embodiments, this circuit replaces the buffer 242 and the buffer 244. The alternative circuit includes the following elements. Two pairs of current mirrored transistors including a first pair of transistors TM1 485 and TM2 487 and a second pair of transistors TP2 488 and TP1 486. The sources of these transistors are coupled to VSS. The drains of the transistors TP1 486 and TM1 485 are coupled to the IOP signal 282 and the IOM signal 284, respectively. The gates of the transistors and the drains of the transistors TM2 487 and TP2 488 are coupled to the SUMM 214 and SUMP 212 signals, respectively. In this circuit, however, the outputs are IOP 282 and IOM 284. This circuit does not convert the currents to voltages, it merely adds the currents. Corresponding changes to the buffers are made in embodiments using this alternative circuit.

e. Digital to Analog Converter

Figure 5:
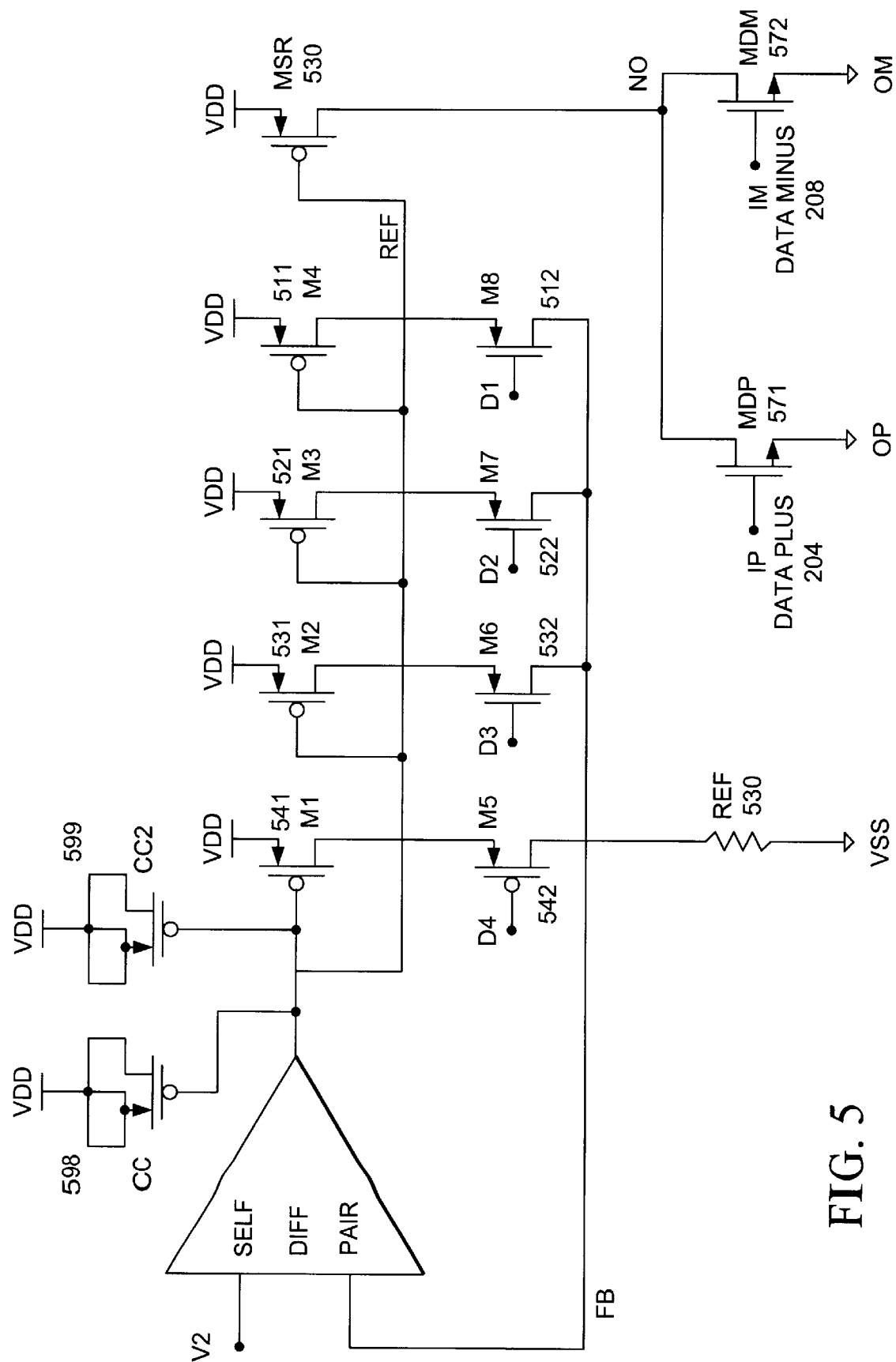
FIG. 5 illustrates a digital to analog converter that can be used in the pre-emphasis control of FIG. 4.

FIG. 5 illustrates one embodiment of a DAC as may be used in the current adder of FIG. 4. In particular, FIG. 5 illustrates the data DAC 422. The pre-emphasis DAC 424 is similarly configured. The following lists the elements of FIG. 5 and then describes their connections and operations.

FIG. 5 includes the following elements: a self-differencing pair 510; a number of transistors; and a resistor 550. The transistors are labeled 541, 542, 531, 532, 521, 522, 511, 512, 540, 571, 572, 598, and 599.

The elements of FIG. 5 are coupled as follows. The transistor 598 and the transistor 599 are configured as capacitors with their sources and drains coupled to VDD and their gates coupled to the output of the self-differencing pair 510. The output of the self-differencing pair 510 is coupled to the gates of the transistors 541, 531, 521, 511 and 540. The sources of the transistors 541, 531, 521, 511 and 540 are coupled to VDD. The drains of these transistors are coupled to the sources of the following transistors: 542, 532, 522, 512, respectively. The drains of the transistors 542, 532, 522, and 512 are coupled to one end of the resistor 550. The other end of the resistor 550 is coupled to VSS. The gates of the transistors 542, 532, 522, and 512 are coupled to the data inputs D4 through D1 respectively. The drain of the transistor 540 is coupled to the sources of the transistors 571 and 572. The gates of the transistors 571 and 572 are coupled to the positive input and the negative input of the DAC. The drains of the transistors 571 and 572 are coupled to the positive and negative outputs of the DAC, respectively. The drains of the transistors 542, 532, 522, and 512 are also coupled to the one input of the self-differencing pair 510. The other input is coupled to V4 454.

The DAC of FIG. 5 operates as follows. The input bits D4 through D1 selectively turn on different pairs of transistors. These transistors have different gains which provide different levels of output at the two output signals. The transistors associated with D4 have the highest gains while the transistors associated with D1 have the lowest gains.

In some embodiments, the self-differencing pair 510 includes an operational amplifier. The self-differencing pair 510 regulates the reference voltage for the current source transistor 540 so that the current source is controlled and stable.

In some embodiments, the resistor 550 is replaced by a transistor acting as a resistor.

The transistor 599 and the transistor 598, configured as capacitors, help stabilize the feedback loop in the DAC.

f. Buffers

Figure 6:
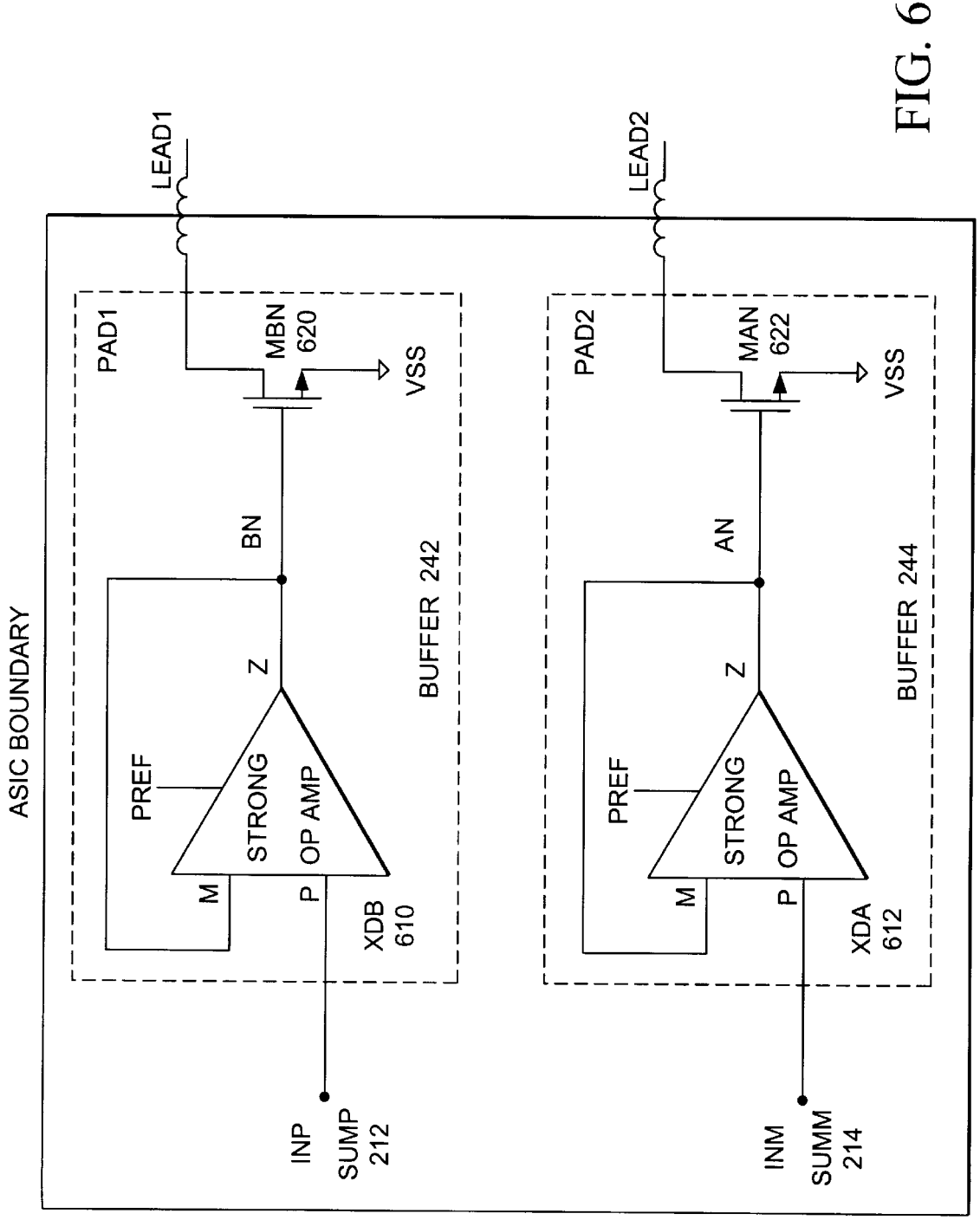
FIG. 6 illustrates an NMOS transistor buffer as may be used in the NIC of FIG. 2.

FIG. 6 illustrates one embodiment of the buffer 242 and the buffer 244.

FIG. 6 includes the following configuration of elements. An operational amplifier 610 has one input coupled to SUMP 212, while the other input is tied to its output. The output is also tied to the gate of an NMOS transistor 620. The transistor 620 is a large driving transistor that can drive relatively large currents (e.g., gate width 900 times larger than the gate length). The drain of the transistor 620 is tied to the pin 217. The source is tied to VSS. SUMM 214 is similarly tied to an operational amplifier 612, which is tied to an NMOS transistor 622. The operational amplifier 612 and the transistor 622 are configured similarly to the configuration of the operational amplifier 610 and the transistor 620.

FIG. 6 is now discuss in relation to previous buffers. In place of the transistor 620 or the transistor 622, previous systems typically used a push transistor and a pull transistor, or a set of operational amplifiers that would push and pull the current. Although relatively stable, these previous systems had the disadvantage of always having one transistor turned on (either sourcing or sinking current). Having some transistors turned on all of the time greatly increases the power used.

In the buffers of FIG. 6, only one transistor 620 or transistor 622 is turned on at a time, and only when data is being transmitted. The resistor 224 dissipates the power that was previously dissipated by the complementary transistors in each buffer. This means that the power is dissipated off chip and allows for a higher degree of integration on the Ethernet controller 201. Thus, in some embodiments, multiple ports transmission ports can be driven from multiple Ethernet controllers 201 being integrated on one silicon die because the reduced power consumption per port makes package and power limitations less of a problem and within practical current ASIC technology.

As noted above, the common source organization of the buffers would be more difficult to control than previous two transistor solutions were it not for the use of the feedback. Without the feedback from the output of the transformer 220, it would be difficult to determine whether the single transistor drivers are sufficiently controlled.

The operational amplifier 610 and the operational amplifier 612 are optional in some embodiments. These operational amplifiers help reduce the RC time constant of the buffers and enhance the performance of the buffers.

g. Operational Amplifier

Figure 7:
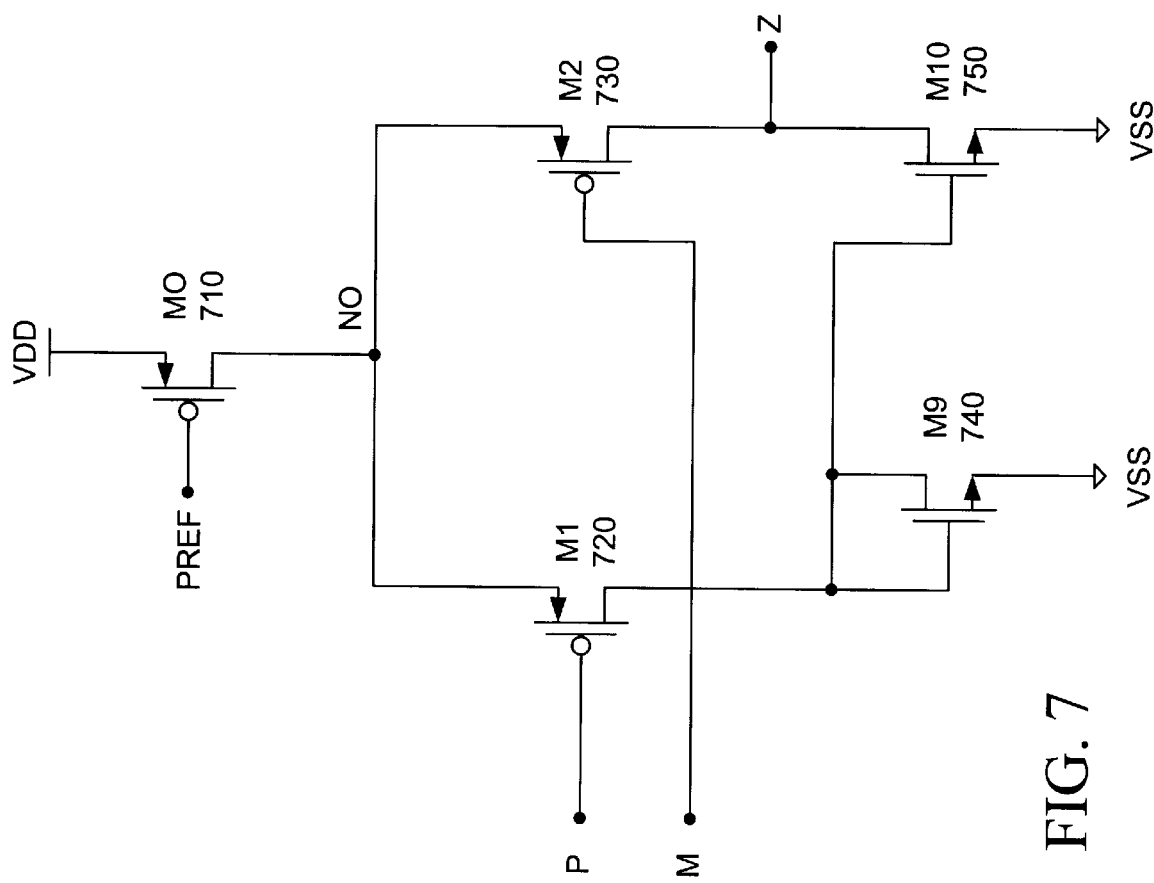
FIG. 7 illustrates operational amplifier as may be used in the NMOS transistor buffer of FIG. 6.

FIG. 7 illustrates one embodiment of the operational amplifiers used in FIG. 6. The operational amplifier includes PMOS transistors (a transistor 710, a transistor 720, and a transistor 730) and NMOS transistors (a transistor 740 and a transistor 750). The gate of the transistor 710 is coupled to the reference voltage. The source is coupled to VDD, while the drain is coupled to the sources of the transistor 720 and the transistor 730. The gate of the transistor 720 is coupled to the first input to the operational amplifier. The drain of the transistor 720 is coupled to the drain and gate of the transistor 740 and the gate of the transistor 750. The gate of the transistor 730 is coupled to the second input to the operational amplifier. The drain of the transistor 730 is coupled to the output of the operational amplifier and the drain of the transistor 750. The sources of the transistor 740 and the transistor 750 are coupled to VSS.

The operational amplifier of FIG. 7 is configured, and operates, similarly to prior art operational amplifiers.

h. Integrated Transformer

Figure 8:
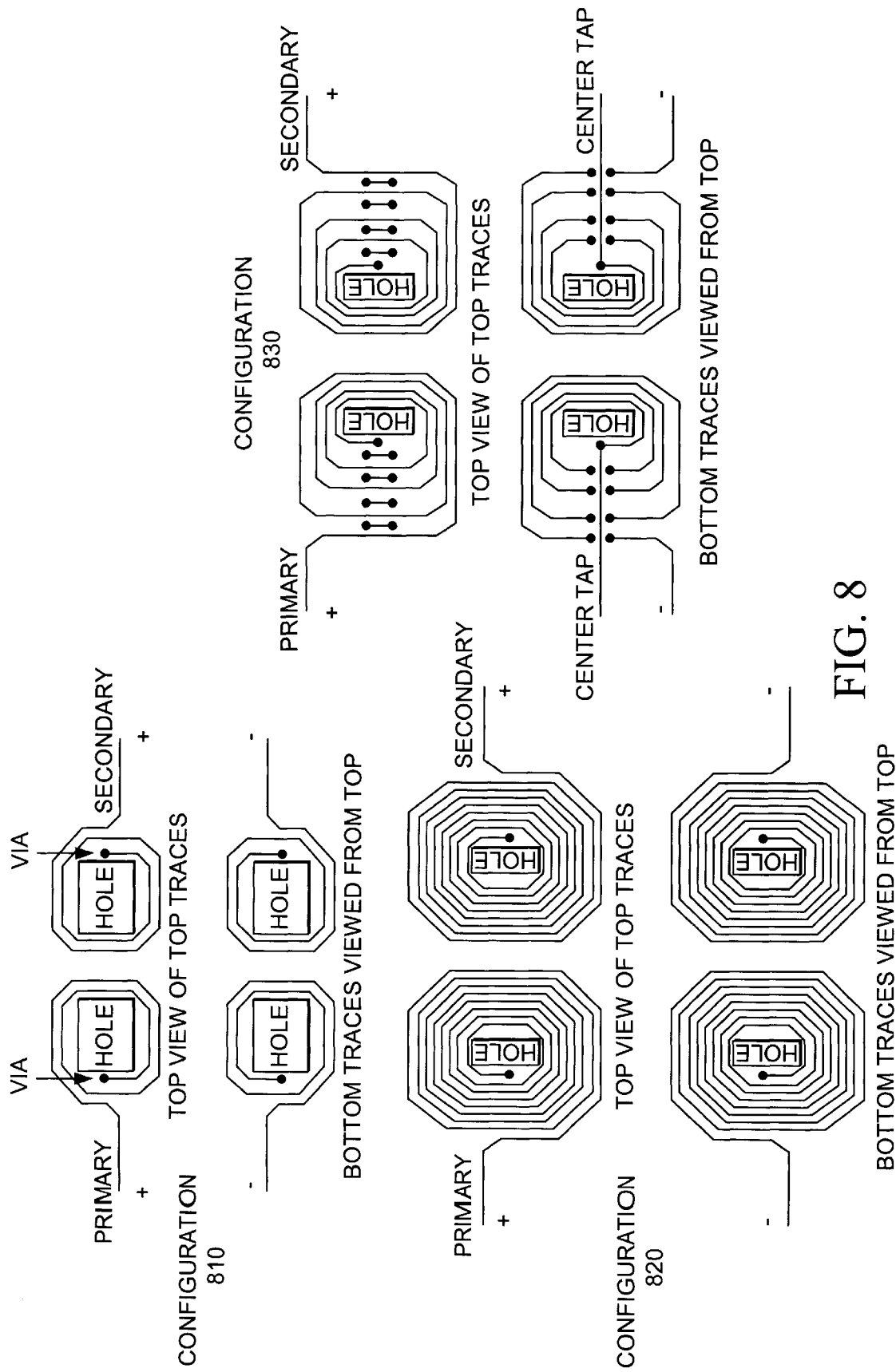
FIG. 8 illustrates integrated transformer traces as may be used in some embodiments of the invention.

FIG. 8 illustrates example transformer winding as may be used in embodiments of the invention where the transformer 220 is an integrated filtering transformer. For each of the transformers, the windings are made from traces on the NIC 200's printed circuit board, while a ferrite core is disposed through holes in the printed circuit board. In some embodiments, the parasitic characteristics of the configurations are used to filter the undesirable high frequency components out of the TDP 112 and the TDM 114 signals. Some embodiments of the transformer 220 are described in the United States patent application Ser. No. 08/641,375, and entitled "Isolation and Signal Filter Transformer," having inventors Marwan A. Fawal, and Anthony Pan, which is incorporated herein by reference.

The configuration 810 has only a few turns in the primary and secondary windings. The windings are made of copper traces on the printed circuit board. In the configuration 810, traces on both sides of the board increase the number of turns without significantly impacting the spacing requirements of the transformer 220. In some embodiments, the third winding, used for the feedback signal 299, overlays or underlies the secondary winding. This third winding is formed from traces in Mylar, or other suitable insulating material, or is formed on a different layer in the printed circuit board. In other embodiments, the third winding is formed from an additional set of traces that are positioned near the primary traces (in a configuration similar to the secondary winding traces). The ferrite core would also be disposed in a hole in the center of the third windings. In some embodiments, the second winding and the third winding are parallel traces wound around the same core.

The configuration 820 has more turns in the windings than the configuration 810. The configuration 820 can be used where the manufacturing tolerances of the printed circuit board manufacturing allows. The configuration 820 has different parasitic characteristics than the configuration 810 and has a resulting change in the filtering characteristics of the transformer 820.

The configuration 830 acts as a center tap transformer. In this configuration, the unused portion of the secondary winding is used for the feedback 299 signal.

i. Example Signals

FIG. 9 through FIG. 12 illustrate example signals at various points in the NIC 200. The figures show that a good quality waveform is created by the NIC 200 and that the power requirements of the system are significantly reduced over previous systems.

Figure 9:
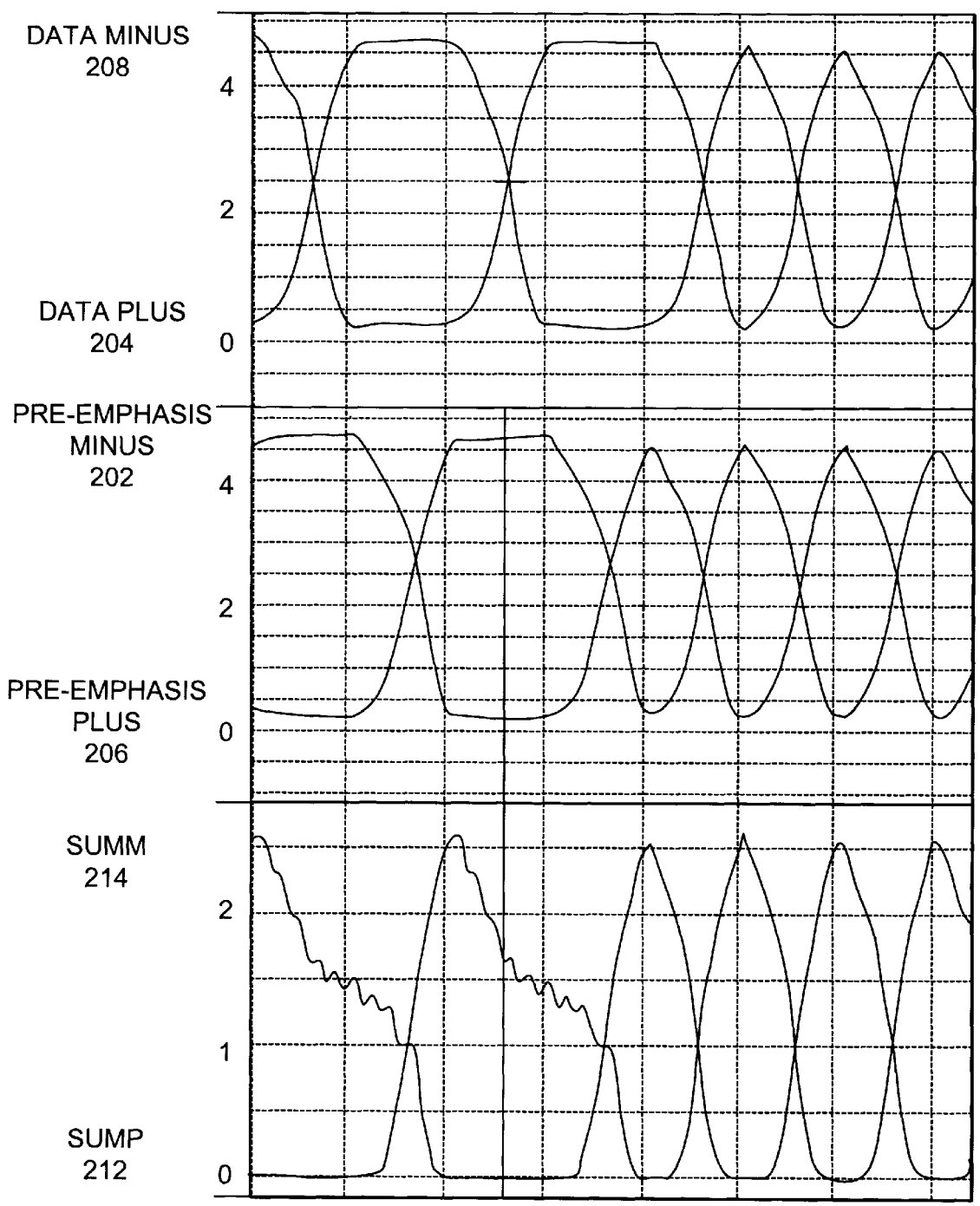
FIG. 9 through FIG. 12 are graphs illustrating various signals in the NIC of FIG. 2.
Figure 10:
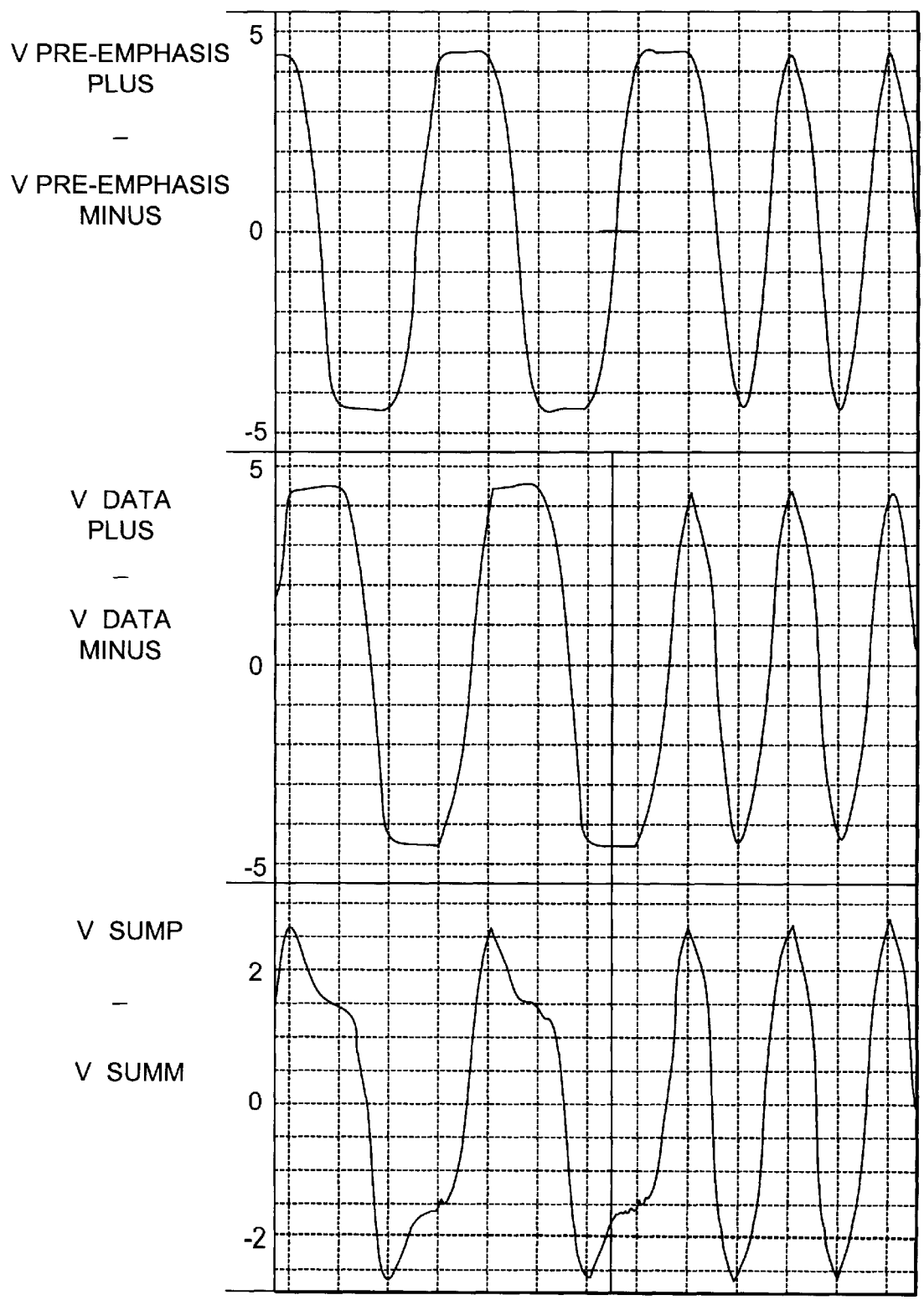

FIG. 9 and FIG. 10 illustrate the signals after the integrators. Note integrators cause the sawtooth shape of the 10 MHz input signals to the adder circuit 270. The results of the adder circuit 270 are shown as SUMM 214 and SUMP 212. FIG. 10 shows the combination of SUMP 212 and SUMM 214.

Figure 11:
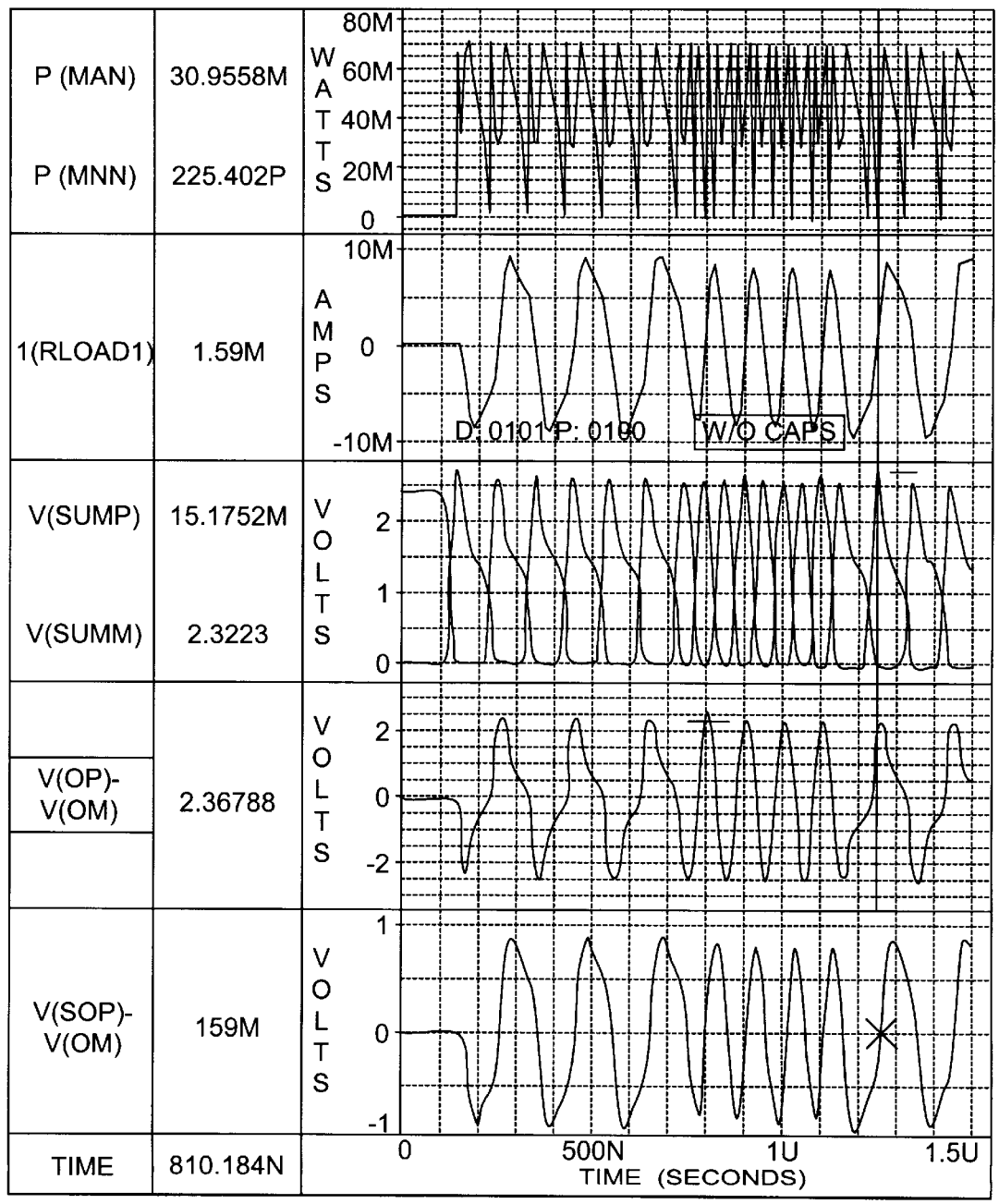
Figure 12:
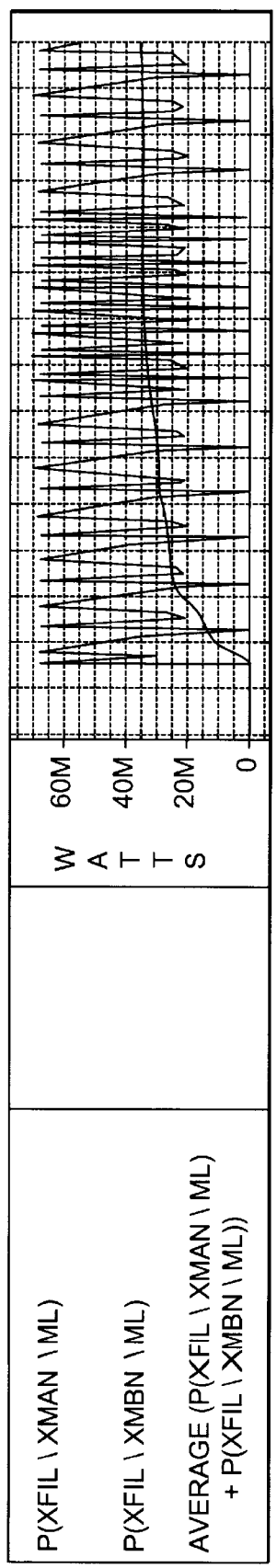

At the top graph of FIG. 11 shows the instantaneous power through each of the driver transistor 620 and the driver transistor 622. The instantaneous peak power usage of one of these transistors is 70 milliwatts. If a complementary pair had been used, as is done in prior art systems, the power dissipation doubled and would be continuous (continuous 140 milliwatt dissipation). Because the power usage in some of the embodiments peaks and then drops, the average power usage levels out at approximately 40 milliwatts (this is shown in FIG. 12).

The second from the top graph of FIG. 11 shows the current through a typical 100 ohm load across TDP 112 and TDM 114. This current supply is within the specifications of the system.

The third from the top graph of FIG. 11 again shows the SUMP 212 and the SUMM 214 signals. This graph shows these signals for a longer period of operation than similar graph in FIG. 9.

The fourth from the top graph of FIG. 11 shows the voltage across the secondary winding of the transformer 220. At the location of the cursor in the graph, the voltage is 2.36788 volts. The output should be between 2.2 and 2.8 volts to match the requirements of the Ethernet standards voltage template. Remember, that it is desirable to have the voltage as low as possible to reduce electromagnetic interference. When the load varies, the feedback elements vary the output from the adder circuit 270 to keep the output voltage low while maintaining sufficient current.

The last graph of FIG. 11 shows the voltage across a load representing a cable. This graph shows that the shape of the signal across the cable model is within the requirements of the Ethernet specifications.

The graph of FIG. 12 shows the power usage of the driving transistors. The average power usage is shown. As noted above, the average power usage levels off at approximately 40 milliwatts.

j. Template Fit

Figure 13:
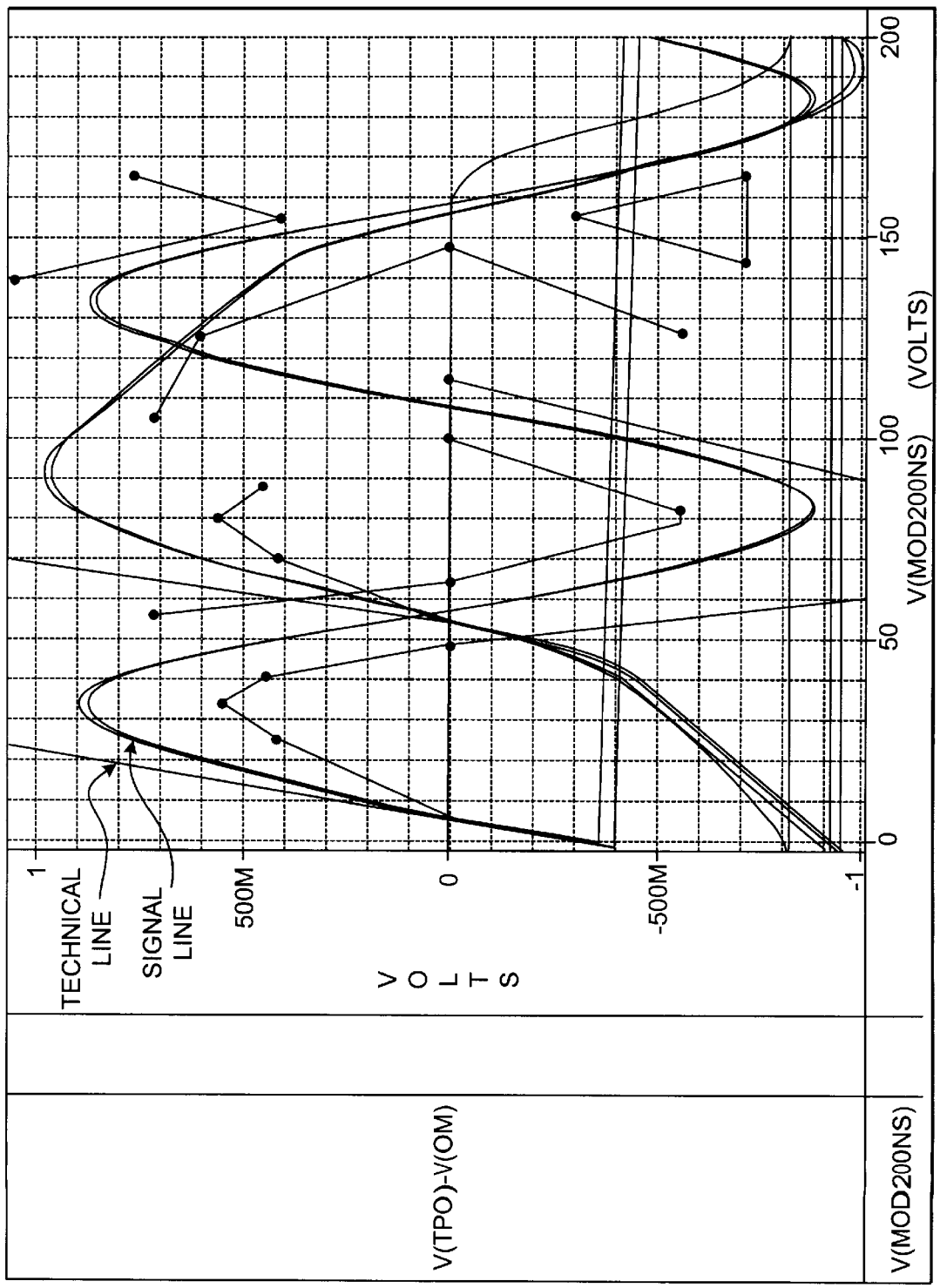
FIG. 13 illustrates the fit of the output signal from the NIC of FIG. 2 to the required voltage template.

FIG. 13 shows the Ethernet standard voltage template with signals from the NIC 200 overlaid. This template is for the voltage across a model cable load across the secondary winding of the transformer 220. As shown in the template, the 5 MHz and 10 MHz signals all fit within the template.

k. Additional Alternative Embodiments

Other embodiments of the invention are included in other devices. For example, one embodiment of the invention is not included on a network interface card, but is included on the main processing board of a computing device. The location of the components is not important in some embodiments of the invention. In other embodiments, the circuits are included in any device that supports Ethernet communications.

In some embodiments, where a device supports multiple ports with Ethernet communications, a single integrated circuit (a multiport controller) is used to control multiple ports. The multiport controller includes multiple copies of the circuitry in the Ethernet controller 201. Multiple copies of the external circuitry are also included in these devices. Importantly, because the integrated circuit dissipates significantly less power than previous systems, on a per port basis, many more ports can be supported by the single multiport Ethernet controller.

In some embodiments, the feedback circuitry allows for automatic testing of the cable attached to the NIC 200. Previous NICs could not easily test the cables. In the systems that use the feedback circuits to test the cables, during a testing phase (e.g., using special packets or using the link pulse), threshold values for the window comparator are varied. By examining the results of the feedback, the Ethernet controller 201 can determine the values at which the circuit is stable (different qualities of cables will have different loads). From this information, the Ethernet controller 201 can determine whether the cable is very good, good, or bad. Effectively, the feedback circuitry gauges the quality of the cable attached to the NIC 200. This type of test system has a significant advantage in hubs, or other devices supporting multiple Ethernet connections, because the quality of multiple cables and/or connections can be tested quickly.

As described above, many of the above embodiments require only a single feedback pin. However, in some embodiments, two feedback pins are used. In these embodiments, the bias voltage is generated in the Ethernet controller 201. Other embodiments of the invention do not have any feedback pins. In these cases, the feedback is taken at the output of the adder 270 (or at the output of the buffer 242 and the buffer 244).

Other embodiments of the invention are directed to other communications protocols. That is, the ideas described above are not limited to 10 MHz Ethernet communications. Similar techniques can be used for other local area network communications protocols (e.g., 100 MHz Ethernet communications, token ring communications, etc.).

l. Conclusion

A network interface card with an Ethernet controller circuit has been described. The Ethernet controller circuit generates an Ethernet output signal that includes a pre-emphasis component and a data component. The Ethernet controller circuit monitors the Ethernet output signal and adjust the levels of the pre-emphasis component and the data component to reduce the electromagnetic interference caused by the network interface card.

What is claimed is:

1. A circuit for buffering a local area network communications signal prior to a transmission of said local area network communications signal, said circuit comprising:

an integrated circuit coupled to receive a twisted pair data transmission, including a first signal and a second signal;

a first transistor being formed in said integrated circuit, said first transistor coupled to generate a positive component of the local area network communications signal from the first signal, said first transistor being configured as a first amplifier for amplifying said first signal to generate said positive component; and a second transistor being formed in said integrated circuit, said second transistor coupled to generate a negative component of the local area network communications signal from the second signal, said second transistor being configured as a second amplifier for amplifying said second signal to generate said negative component.

2. The circuit of claim 1 wherein said first transistor and said second transistor each include an NMOS transistor.

3. The circuit of claim 1 wherein the integrated circuit includes a first pin and a second pin, and wherein the gate of the first transistor is coupled to receive said first signal, wherein the drain of the first transistor is coupled to said first pin, and wherein the source of the first transistor is coupled to VSS.

4. The circuit of claim 1 further comprising a first operational amplifier and a second operational amplifier, said first operational amplifier and the second operational amplifier are configured to reduce the RC time constant of the first transistor and the second transistor.

5. The circuit of claim 1 wherein said integrated circuit is coupled to receive a feedback signal, said feedback signal is used for controlling said first signal and said second signal to ensure that said local area network signal conforms to Ethernet transmission requirements.

6. The circuit of claim 5 wherein said Ethernet transmission requirements include 10 MHz Ethernet transmission requirements.

7. The circuit of claim 5 wherein said Ethernet transmission requirements include 100 MHz Ethernet transmission requirements.

8. The circuit of claim 1 further comprising a filter circuit, said filter circuit not being formed on said integrated circuit, said filter circuit for filtering out high frequency components of said positive component and said negative component.

9. The circuit of claim 8 wherein said circuit is supported by a printed circuit board, wherein said filter circuit includes an isolation transformer, and wherein said isolation transformer is formed at least partially from traces on said printed circuit board.

10. A circuit for buffering a local area network communications signal prior to a transmission of said local area network communications signal, said local area network communications signal including a positive component and a negative component, said circuit comprising:

an integrated circuit;

a first transistor being formed in said integrated circuit, said first transistor coupled to generate said positive component from a first signal, said first transistor for amplifying said first signal to generate said positive component;

a second transistor being formed in said integrated circuit, said second transistor coupled to generate said negative component from a second signal, said second transistor for amplifying said second signal to generate said negative component;

a filter circuit, said filter circuit not being formed on said integrated circuit, said filter circuit for filtering out high frequency components of said positive component and said negative component; and wherein said first transistor and said second transistor are configured as amplifiers, and said filter circuit includes a center tapped transformer, said center tapped transformer having a primary winding and a secondary winding, said primary winding having a center tap, a first terminal and a second terminal, and wherein said first terminal is coupled to receive said positive component from said first transistor, wherein said second terminal is coupled to receive said negative component from said second transistor, and wherein said center tap is coupled to one half of VDD.

11. A circuit for buffering Ethernet signals, said circuit comprising:

an integrated circuit for generating said Ethernet signals;

a transformer for isolating said integrated circuit and filtering said Ethernet signals, said transformer having a primary winding and a secondary winding, the primary winding including a first terminal and a second terminal; and wherein said integrated circuit includes a first transistor and a second transistor, said first transistor and said second transistor each being configured as a common source amplifier, wherein said first transistor and said second transistor coupled to provide said Ethernet signals to said primary winding, the first terminal of the primary winding receiving a positive component a signal from the first transistor, and the second terminal of the primary winding is coupled to receive a negative component of the signal from the second transistor.

12. The circuit of claim 11 wherein said integrated circuit includes a first operational amplifier and a second operational amplifier, each operational amplifier being configured to reduce the RC time constant of said first transistor and said second transistor.

13. The circuit of claim 11 wherein said first transistor includes an NMOS transistor.

* * * * *